United States Patent Office 3,600,457
Patented Aug. 17, 1971

3,600,457
SHORT CYCLE CATALYTIC DEHYDROGENATION
OF ALKANES
Avery D. Milloy, Beacon, and Edwin R. Kerr, Wappingers
Falls, N.Y., assignors to Texaco Inc., New York, N.Y.
No Drawing. Filed Feb. 24, 1969, Ser. No. 801,858
Int. Cl. C07c 5/18, 3/28
U.S. Cl. 260—683.3                                  7 Claims

ABSTRACT OF THE DISCLOSURE

Normal alkanes are catalytically dehydrogenated in a two period cyclic operation alternating between a reaction period of less than 60 seconds and a regeneration period 1 to 10 times as long. A mixture of steam and alkane passes through the catalyst during the reaction period while a mixture of steam and air is used to reactivate the catalyst during the regeneration period.

BACKGROUND OF THE INVENTION

This invention relates to improvements in the catalytic conversion of hydrocarbons. More particularly, it relates to improvements in the catalytic treatment of hydrocarbons wherein the catalyst loses activity but is regenerated for reuse in the process. More particularly, this invention relates to a short cycle catalytic process for dehydrogenating long chain paraffinic hydrocarbons.

It is well known that saturated aliphatic hydrocarbons and alkyl aromatic hydrocarbons can be converted to unsaturated hydrocarbons by catalytic dehydrogenation. A wide variety of catalytic systems and processes have been developed for the production of olefins. Large quantities of butadiene and styrene have been produced by such dehydrogenation processes. Although the decline in catalyst activity often requires periodic reactivation of the catalyst, what is normally a cyclic operation can be made a continuous one through the use of a multiplicity of vessels and the necessary piping connections and valving. In addition, these processes are often operated adiabatically with the heat balance requirement being maintained between the endothermic dehydrogenation of the hydrocarbon during the reaction period and the exothermic release during the regeneration portion of the cycle.

In catalytic dehydrogenation the activity of the catalyst generally declines due to the formation of polymers and coke on the surface of the catalyst. Periodically, therefore, processing of the hydrocarbon stream must be terminated and the catalyst bed replaced or regenerated. Air blowing at temperatures of 1000 to 1100° F. or steaming at high temperatures are techniques employed by the prior art to return a dehydrogenation catalyst to its former activity levels. In some instances, catalytic activity may remain sufficiently high during dehydrogenation to permit the use of a catalyst bed for as long as six months before replacement or regeneration of the catalyst is necessary. In other instances, frequent regeneration is necessary to maintain the catalyst activity at a high level. The necessity for regeneration is of course dictated by many factors including the specific catalyst employed, feed stock quality or condition, the product desired and the overall economics of the process being employed.

The dehydrogenation of hydrocarbons is most favorably conducted at lower pressures. This is often achieved by maintaining the reactant at a low partial pressure through the use of vacuum or diluent gases. Commercially, the addition of large volumes of steam achieved the desired low partial pressure for the hydrocarbon although this requires that the catalyst be substantially unaffected by water. A catalyst of vanadia, $V_2O_5$, on an alumina support such as Alundum is one which may usefully be employed with a steam diluent in a hydrocarbon dehydrogenation process. Although this catalyst is steam stable and may be regenerated for reuse, it has the disadvantage of rapidly losing its activity when coke and/or carbon begin to build up within the catalyst bed. Despite the need for frequent regeneration this catalyst is a particularly desirable one when ormal alkanes are being dehydrogenated since the resultant product consists predominately of mono-olefins.

It is known that hydrocarbons may be catalytically dehydrogenated by pulsing the feed into an inert vaporous carrier. However, the importance of the duration of both the "on" and "off" periods was undetermined. Further it was not discovered that with a particular ratio of "on"-"off" periods and by employing steam as the diluent regeneration of the catalyst could be achieved during the "off" period. In copending application Ser. No. 671,066 (now Pat. No. 3,429,941) a short cycle process of catalytically dehydrogenating polyalkylaromatic hydrocarbons is disclosed and claimed. This short cycle operation alternates between a reaction period of short duration and a regeneration period bearing a particular ratio to the reaction period. In this process steam serves as the hydrocarbon diluent as well as the means for regenerating the catalyst.

SUMMARY OF THE INVENTION

We have found that in the catalytic dehydrogenation of normal alkanes, such as the $C_3$–$C_{30}$ normal alkanes, with a catalyst of $V_2O_5$ on alumina, the activity of the catalyst may be substantially maintained at its initial activity level by employment of the short cycle operation of our invention. This short cycle operation consists of a reaction period and a regeneration period wherein the reaction period is maintained below 60 seconds and the regeneration period is 1 to 10 times longer, preferably 1.5 to 5 times longer, than the process period. Ideally the reaction period should be maintained for about 30 seconds while the regeneration period should last for about 90–150 seconds. In the regeneration period, although steaming of the catalyst will regain some of the last activity, we found it is preferred to use a mixture of steam and air to obtain the maximum benefits of the short cycle technique.

The α mono-olefins produced by the catalytic dehydrogenation of normal alkanes are useful as charge stock in the manufacture of biodegradable detergents.

By using the short cycle technique of our invention the initial activity of a regenerable dehydrogenation catalyst may be substantially maintained.

DESCRIPTION OF THE PREFERRED
EMBODIMENTS

In catalytic dehydrogenation of hydrocarbons the catalyst is often present in the system as a fixed bed with the hydrocarbon stream passing in contact with it continuously. The depth of the fixed bed and the space velocity of the reactants are such that the hydrocarbon stream often remains in contact with the catalyst for about 0.1 to 5 seconds. During the dehydrogenation reaction, carbon, as well as condensed or polymeric hydrocarbons, forms in small quantities and often condenses on the surface of the catalyst. After extended periods of time at high temperature these materials are transformed into coke-like depositions. The carbon, the condensed or polymeric hydrocarbons and the resultant coke inhibit the action of the catalyst and gradually reduce its activity. Removal of these materials usually returns the catalyst to its initial activity. While the carbon and condensed material may be easily removed shortly after their deposition on the catalyst, the coke which they produce after an extended processing run is removed only by a prolonged and often vigorous regeneration. However, in some instances when the catalyst is regenerated shortly after the deposition of these materials on the catalyst surface, the removal may be achieved quite readily and easily by a high temperature sweep gas such as steam. With some catalysts more severe regeneration methods may be required even though performed promptly after formation of the coke or carbon.

Our invention is useful in the catalytic dehydrogenation of $C_3$–$C_{30}$ normal alkanes to produce monoolefins wherein the hydrocarbon, mixed with a diluent stream of high temperature steam, is passed in contact with a bed of catalyst such as $V_2O_5$ on an alumina support such as Alundum. This catalyst produces a dehydrogenated product consisting predominately of monoolefins and although it deactivates rapidly it is regenerable. Any of the $C_3$–$C_{30}$ normal alkanes, particularly the $C_6$–$C_{20}$ normal alkanes, may be dehydrogenated by the process of our invention.

In general, our invention is practiced by use of a short cycle process comprising a reaction period and a regeneration period wherein the reaction period is less than one minute and the regeneration period is 1 to 10 times longer, preferably 1.5 to 5 times longer, than the reaction period. This may be accomplished by continuously passing steam, which serves both as the hydrocarbon diluent and the regeneration medium, through the catalyst bed and pulsing the hydrocarbon into the steam during the short reaction period. Although the vanadia catalyst will regain some of its activity loss by passing steam through the bed during the regeneration period, we have found that substantially more of the activity can be restored and superior operation achieved if air is admixed with the steam during the regeneration portion of the cycle.

We have found that a $C_3$–$C_{30}$ normal alkane, particularly a $C_6$–$C_{20}$ normal alkane, may advantageously be dehydrogenated in the presence of a regenerable, rapidly deactivating vanadia-alumina catalyst by the short cycle process of our invention under specific operating conditions. The process is conveniently conducted by passing steam through the catalyst bed continuously with the normal alkane introduced into the steam during the reaction period and with air fed into the steam during the regeneration period. We find that the hydrocarbon feed concentration in the steam-hydrocarbon mixture should be between 1 and 15 mole percent, with a 3 to 7 mole percent concentration being preferred. Higher hydrocarbon feed concentrations may be used with a proportionate reduction in the reaction portion of the cycle. Atmospheric pressure in the reaction vessel is preferred but higher or lower pressures may be employed; the steam flow will have to be adjusted accordingly to maintain the hydrocarbon partial pressure in the feed stream between 0.01 and 0.15 atmosphere and preferably between 0.03 to 0.07 atmosphere. Operating temperatures should be maintained at 800 to 1300° F. with 1000 to 1100° F. being preferred. The time the feed is in contact with the catalyst is important. Although the reaction may be conducted with a residence time of the reactant within the catalyst bed of 0.1 o 1 second, we prefer to limit it to 0.15 to 0.35 second. Both the length of the reaction period and the ratio of the regeneration period to the reaction period are important variables and are interrelated. Although we find that the reaction period should be no longer than one minute it should nevertheless be longer than ten seconds. Within this range we prefer a reaction period of twenty to forty seconds. The regeneration period should be in a ratio to the reaction period of between 1:1 and 10:1 although we prefer to operate with a ratio of between 1.5:1 and 5:1. Therefore with a thirty second reaction period, a three hundred second regeneration period would prove operable but 45–150 seconds would be preferred. The quantity of air present in the steam during the regeneration period may be between 1 and 15 mole percent with a 3 to 7 mole percent concentration being preferred. Operating conveniences are often achieved if the molar concentration of air during regeneration is the same as the molar concentration of alkane in the reaction period. Although a variety of process conditions are operable, those skilled in the art will appreciate that the particular conditions selected will be dictated by the feedstock, and the product and selectivity desired.

It is thought that the unexpected improvements resulting from the short cycle operation of our invention are attributable to the fact that the catalyst is never allowed to become completely deactivated or cooked. The condensed or polymeric hydrocarbons which form on the catalyst sites in the process period of the cycle are immediately removed by the steam-air mixtures in the regeneration portion of the cycle. If they were allowed to remain on the catalyst for extended periods of time at high temperatures, they would be transformed into materials that would require severe regeneration to return the catalyst to a significantly high activity level.

The following are descriptions by way of example of methods of carrying out the process of the present invention. Normal dodecane was selected as typical of the $C_3$–$C_{30}$ normal alkanes and the $C_6$–$C_{20}$ normal alkanes which may be dehydrogenated by this process.

EXAMPLE I

In a series of runs, the dehydrogenation of n-dodecane was used to demonstrate the advantages of the process of our invention over a continuous dehydrogenation process.

In these runs, n-dodecane was dehydrogenated in the presence of a vanadia-alumina catalyst. The reaction was conducted at a temperature of 1050° F., the concentration of n-dodecane in the feed stream of n-dodecane and steam ranged from 4.7 to 5.1 mole percent; atmospheric pressure was employed and the residence time in the catalyst bed was 0.24 second. In the first run a continuous type operation was employed wherein the combined feed was fed to the reactor over a 5 hour period. In two runs illustrative of our invention a mixture of n-dodecane and steam was passed through the reactor during the reaction period and a mixture of steam and air having a mole ratio of steam to air of 19 to 1, was used to reactivate the catalyst in the regeneration cycle. In this run a 30 second reaction period and a 150 second regeneration period was employed and in the last run a 30 second reaction period and a 90 second regeneration period were employed. A gas chromatograph was used to analyze the effluent stream from the reactor. The area under the peak of the curve for a given component was used as a measure of the quantity of that component in the effluent and was expressed as an "area percent" of the total area under all of the peaks for the several components. This permitted a comparison between the test runs. The conversion of n-dodecane and the selectivity of n-dodecene was expressed as:

Percent of n-dodecane conversion $$= 100 \text{ minus the area percent of n-dodecne in the product}$$

Percent n-dodecane selectivity $$= \frac{\text{Area percent of n-dodecene in product} \times 100}{\text{Percent of n-dodecene conversion}}$$

The results of these runs is shown in Table I.

TABLE I.—DEHYDROGENATION OF n-DODECANE

| | Run (process cycle steam+n-dodecane/steam+air) | | | | | |
|---|---|---|---|---|---|---|
| | Continuous, no regeneration | | 30 sec./150 sec. | | 30 sec./90 sec. | |
| | Conversion | Selectivity | Conversion | Selectivity | Conversion | Selectivity |
| Time: | | | | | | |
| Initial | 6.0 | 67 | 5.4 | 76 | 4.2 | 76 |
| 5 min | 3.4 | 52 | 5.5 | 77 | 4.5 | 77 |
| 30 min | | | 5.2 | 74 | 4.3 | 75 |
| 60 min | 1.8 | 36 | | | | |
| 120 min | 1.5 | 39 | | | | |
| 180 min | | | 4.3 | 75 | 4.2 | 70 |
| 300 min | 1.4 | 44 | | | | |

Comparison of the short cycle and continuous type runs shows that short cycle operation maintained the conversion above 4 percent whereas in continuous type operation the conversion decreased from 6.0 to 1.8 in one hour. Dodecene selectivity also decreased along with the conversion in the continuous operation, declining from about 67 percent at 6.0 percent conversion to 36 percent at 1.8 percent conversion. Short cycle operation maintained a higher dodecene selectivity for the same conversion level than did the continuous type operation. Dodecene selectivity in the short cycle run being 70 to 77 percent at a conversion level of 4.2 to 5.5 percent.

EXAMPLE II

This example shows that the use of a mixture of steam and air in the regeneration period of the short cycle process of our invention produces a higher conversion and selectivity than does a comparable operation where steam alone is used to reactivate the catalyst.

Two short cycle dehydrogenation runs were conducted in a manner similar to those of Example I. The reactor contained a bed of vanadia on alumina through which a stream of steam was continuously passed. In each run the conditions included: atmospheric pressure, a temperature of 1050° F. and a residence time in the catalyst bed of 0.25 second. In both runs the concentration of n-dodecane in steam was 5 mole percent during the process period. In Run A air was added to the steam during the regeneration period to provide a mixture having a mole ratio of steam to air of 6.3. In Run B, no air was admitted to the reactor during the regeneration period. In both runs a 30 second reaction period and a 90 second regeneration period were used. The results are presented in Table II.

TABLE II

| | n-Dodecane conversion | n-Dodecene selectivity |
|---|---|---|
| Run A | 12.3 | 70.2 |
| Run B | 4.5 | 56.8 |

These data show that the short cycle process run using a mixture of air and steam in the regeneration period (Run A) effectively maintains a higher catalyst activity for n-dodecane dehydrogenation than when steam alone is used in the regeneration period (Run B).

Obviously many modifications and variations of the invention, as hereinbefore set forth, may be made without departing from the spirit and scope of this invention. Therefore only such limitations should be imposed as are indicated in the claims set forth below.

We claim:
1. A process having alternate reaction periods and regeneration periods for catalytically dehydrogenating a normal alkane which comprises:
(a) passing a first mixture of steam and a normal alkane selected from the group consisting of $C_3$–$C_{30}$ normal alkanes in contact with a regenerable dehydrogenation catalyst under dehydrogenation conditions in a reaction period for between 10 and 60 seconds, and
(b) then, passing a second mixture of steam and air in contact with the catalyst under regeneration conditions in a regeneration period, the ratio of the length of the regeneration period to the length of the reaction period being between 1 and 10.
2. A process according to claim 1 wherein:
the catalyst is $V_2O_5$-alumina combination;
the partial pressure of the normal alkane in the first mixture is 0.01 to 0.15 atmosphere;
the concentration of air in the second mixture is 1 to 15 mole percent; and
the dehydrogenation conditions comprise a temperature of 800–1300° F. and a residence time of 0.1 to 1 second.
3. A process according to claim 2 wherein:
the normal alkane is a $C_6$–$C_{20}$ normal alkane;
the partial pressure of the normal alkane in the first mixture is 0.03 to 0.07 atmosphere;
the concentration of air in the second mixture is 3 to 7 mole percent;
the dehydrogenation conditions comprise a temperature of 1000 to 1100° F. and a residence time of 0.15 to 0.35 second; and
the ratio of regeneration period to reaction period is between 1.5:1 and 5:1.
4. A process according to claim 3 wherein the normal alkane is n-dodecane and the ratio is between 3:1 and 5:1.
5. A process having alternate reaction periods and regeneration periods for catalytically dehydrogenating a normal alkane, which comprises:
(a) passing a mixture of steam and a normal alkane selected from the group consisting of $C_3$–$C_{30}$ normal alkanes in contact with a regenerable dehydrogenation catalyst under dehydrogenation conditions in a reaction period for between 10 and 60 seconds, and
(b) then, passing steam in contact with the catalyst under regeneration conditions in a regeneration period,
the ratio of the length of the regeneration period to the length of the reaction period being between 1 and 10.
6. A process according to claim 5 wherein:
the catalyst is a $V_2O_5$-alumina combination;
the partial pressure of the normal alkane in the mixture is 0.01 to 0.15 atmosphere; and
the dehydrogenation conditions comprise a temperature of 800–1300° F. and a residence time of 0.1 to 1 second.
7. A process according to claim 6 wherein:
the normal alkane is a $C_6$–$C_{20}$ normal alkane;
the partial pressure of the normal alkane in the mixture is 0.03 to 0.07 atmosphere;
the dehydrogenation conditions comprise a temperature of 1000 to 1100° F. and a residence time of 0.15 to 0.35 second; and the ratio of the regeneration period to the reaction period is between 1.5:1 and 5:1.

References Cited

UNITED STATES PATENTS

| | | | |
|---|---|---|---|
| 2,172,534 | 9/1939 | Grosse | 260—683.3 |
| 2,397,218 | 3/1946 | Sturgeon | 260—683.3 |
| 3,243,472 | 3/1966 | Dinwiddie | 260—680 |
| 3,429,941 | 2/1969 | Kerr et al. | 260—669 |

DELBERT E. GANTZ, Primary Examiner

G. E. SCHMITKONS, Assistant Examiner

U.S. Cl. X.R.

260—669R, 680R, 680E